United States Patent
Maisons

(10) Patent No.: US 8,422,334 B2
(45) Date of Patent: Apr. 16, 2013

(54) SYSTEM, METHOD AND COMPUTER PROGRAM PRODUCT FOR DETECTION OF SEISMIC EVENTS FROM A NETWORK

(75) Inventor: Christophe Maisons, La Tour d'Aigues (FR)

(73) Assignee: Magnitude SPAS (FR)

( * ) Notice: Subject to any disclaimer, the term of this patent is extended or adjusted under 35 U.S.C. 154(b) by 1038 days.

(21) Appl. No.: 11/935,822

(22) Filed: Nov. 6, 2007

(65) Prior Publication Data

US 2008/0137475 A1    Jun. 12, 2008

Related U.S. Application Data

(60) Provisional application No. 60/864,475, filed on Nov. 6, 2006.

(51) Int. Cl.
*G01V 1/00* (2006.01)
*G01V 1/40* (2006.01)

(52) U.S. Cl.
USPC ............................. 367/25; 367/14

(58) Field of Classification Search ........... 181/107, 181/122; 73/649; 346/33 C, 420; 340/17, 340/601, 690; 709/224; 702/15; 367/13, 367/191; 370/390; 250/332; 717/100
See application file for complete search history.

(56) References Cited

U.S. PATENT DOCUMENTS

| | | | |
|---|---|---|---|
| 3,877,296 A * | 4/1975 | Rihn ............................... 73/653 |
| 4,616,320 A * | 10/1986 | Kerr et al. ....................... 702/14 |
| 4,649,524 A | 3/1987 | Vance | |
| 5,377,104 A * | 12/1994 | Sorrells et al. ................. 702/11 |
| 5,771,170 A * | 6/1998 | Withers et al. ................. 702/16 |
| 6,265,979 B1 | 7/2001 | Chen | |
| 7,020,701 B1 | 3/2006 | Gelvin | |
| 2006/0009911 A1 * | 1/2006 | Burkholder et al. ............ 702/18 |
| 2009/0299637 A1 * | 12/2009 | Dasgupta ........................ 702/12 |

FOREIGN PATENT DOCUMENTS

JP        62126383 A       6/1987

OTHER PUBLICATIONS

Geospace Technologies, Inc. "Microseismic Hydraulic Fracture Monitoring" brochure in Internet archive http://archive.org/index.php, for May 21, 2005, as http://web.archive.org/web/20050521002021/http://www.geospacetech.com/pdf/Microseismic-Hydraulic-Fracture-Monitoring-032004.pdf, downloaded Apr. 4, 2012.*
Hirokazu Moriy, et al. Multiplet-clustering Analysis Reveals Structural Details within Seismic Cloud at the Soultz Geothermal Field, France. Bul. Seism. Soc. Am. pp. 1-31.
Erick Baziw, et al. "A Rao-Blackwellised type algorithm for passive seismic event detection". pp. 135-164.
Microseismic hydraulic fracture monitoring. Geospace Technologies. www.geospacetech.com. 2 pages.

(Continued)

*Primary Examiner* — Mark Hellner
*Assistant Examiner* — Daniel L Murphy
(74) *Attorney, Agent, or Firm* — Cantor Colburn LLP

(57) ABSTRACT

Disclosed is a system for detecting seismic events, the system including a plurality of seismic receivers, at least one of the receivers in the plurality adapted for: monitoring seismic activity, providing an alert to at least another of the receivers in the plurality upon detection of a seismic event, and triggering the monitoring in the at least another of the receivers in the plurality. A method and computer program product for monitoring seismic events is also disclosed.

18 Claims, 4 Drawing Sheets

OTHER PUBLICATIONS

Christophe Maisons, et al., "Induced Microseismicity and Procedure for Closure of Brine Production Caverns", Pure and Applied Geophysics, Birkhaeuser Verlag, Basel, vol. 150, Jan. 1, 1997, pp. 585-603, XP007908138.
International Search Report and Written Opinion Mailed May 8, 2009; PCT/IB2007/004601, International Search Report 8 pages, Written Opinion 7 pages.
James Albright, et al. "Seismic Surveillance for Monitoring Reservoir Changes". Oilfield Review. vol. 6. No. 1, Jan. 1994. pp. 4-14.
Stuart Jardine, et al. "Putting a damper on Drilling's Bad Vibrations". Oilfield Review. vol. 6. No. 1, Jan. 1995. pp. 15-20.
Les Bennett, et al. "The Source for Hydraulic Fracture Characterization". Oilfield Review. Winter 2005/2006. pp. 42-57.
Andrey Bakulin, et al. "Downhole acoustic surveillance of deepwater wells". The Leading Edge. Apr. 2008. pp. 518-531.
Hirokazu Moriy, et al. Multiplet-clustering Analysis Reveals Structural Details within Seismic Cloud at the Soultz Geothermal Field, France. Bul. Seism. Soc. Am. pp. 1-31, Aug. 2003.
Torsten Clemens, "Resrvoir Performance and Monitoring". Technology Focus. JPT. Sep. 2008. pp. 84-99.
Stephen Wilson, et al. "Passive seismic makes sense for 4D reservoir monitoring". firstbreak vol. 23, Oct. 2004. pp. 59-65.
Erick Baziw, et al. "A Rao-Blackwellised type algorithm for passive seismic event detection". pp. 135-164, Dec. 14-15, 2004.
Microseismic hydraulic fracture monitoring. Geospace Technologies. www.geospacetech.com. 2 pages, May 21, 2005.

* cited by examiner

SYSTEM, METHOD AND COMPUTER PROGRAM PRODUCT FOR DETECTION OF SEISMIC EVENTS FROM A NETWORK

CROSS REFERENCE TO RELATED APPLICATIONS

Under 35 U.S.C. §119(e), this application claims the benefit of U.S. Provisional Application No. 60/864,475, filed Nov. 6, 2006, the entire disclosure of which is incorporated herein by reference.

BACKGROUND OF THE INVENTION

1. Field of the Invention

The teachings herein relate to seismic tools used in subterranean exploration, and in particular, to techniques for detection of seismic events.

2. Description of the Related Art

Subterranean formations may be monitored using one or more seismic receivers. The receivers may be geophones placed at the surface or submerged in wells or on the ocean floor. Also, the receivers may be hydrophones placed in those same locations, but sensitive to only certain types of waves. The receivers placed in wells may be shallow (usually above the formation of interest) or deep (at or below the formation of interest). Seismic receivers may be sensitive to seismic waves along a certain axis or those traveling on any axis. Likewise, the receivers may be sensitive to only certain types of seismic waves, or several types. Those sensitive to a certain axis of travel, called directional receivers, may be coupled with other directional receivers. For example, a directional receiver may be coupled with two other directional receivers in a set of three orthogonal receivers which collect information about the waves in three dimensions. This three-dimensional information may be rotated mathematically through the use of trigonometric functions in order to derive information as to wave travel in the x-axis, y-axis, and z-axis relative to gravity. Alternatively, mathematical rotation may provide translation of the data relative to a wellbore, a cardinal direction, or any other reference point.

Microseismic monitoring concerns passively monitoring a formation for seismic events which are very small. Such events may include the seismic effects generated in a formation by fracturing, depletion, flooding, treatment, fault movement, collapse, water breakthrough, compaction or other similar subterranean interventions or effects. One of the main problems with microseismic monitoring, as with other forms of seismic monitoring, is that of noise. With microseismic events, however, the problem is emphasized because the signal strength is generally very small. This means, in turn, that a small amount of noise which would not cause any significant effect as to a regular, active seismic survey causes a significant degradation of the signal to noise ratio in the microseismic survey.

The geology of the microseismic environment is also of interest. Different geological layers are composed of different materials which transmit seismic waves at different velocities. It will be appreciated that when a source occurs in a low-velocity layer, its transmission through to a higher-velocity layer will cause attenuation, as much of the wave energy is reflected back into the low-velocity layer. When a low-velocity layer is sandwiched between two high-velocity layers, the resulting reflections from above and below can make seismic waves within the low-velocity layer very difficult to interpret. Therefore, receivers may be placed in overlying layers in order to provide a more distinct, though attenuated, signal.

Microseismic surveys include receiving data from a receiver, detecting data which exceeds some threshold, and analyzing those over-threshold data in order to determine information about certain events. Data which does not meet the threshold is discarded or simply not recorded as noise data.

Microseismic data may be analyzed as a set, with several receivers providing data for a joint analysis. Data is collected from a receiver and related to the other data collected from other receivers in order to derive additional information about the formation. Information from three receivers, for example, may be triangulated in order to estimate the location of a seismic event.

What are needed are methods and systems for detection of seismic events, such as microseismic events, which permit saving of data for the seismic events.

SUMMARY OF THE INVENTION

Disclosed is a system for detecting seismic events, the system including a plurality of seismic receivers, at least one of the receivers in the plurality adapted for: monitoring seismic activity, providing an alert to at least another of the receivers in the plurality upon detection of a seismic event, and triggering the monitoring in the at least another of the receivers in the plurality.

Also disclosed is a method for detecting seismic events, that includes monitoring seismic events with at least one of a plurality of seismic receivers; providing an alert to at least another of the receivers in the plurality upon detection of a seismic event, and triggering the monitoring in the at least another of the receivers in the plurality.

Further disclosed is a computer program product comprising machine readable instructions stored on machine readable media. The instructions implement a method for detecting seismic events that includes monitoring seismic events with at least one of a plurality of seismic receivers, providing an alert to at least another of the receivers in the plurality upon detection of an event, and triggering the monitoring in the at least another of the receivers in the plurality.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Subterranean formations are of interest for a variety of reasons. Such formations may be used for the production of hydrocarbons, the storage of hydrocarbons or other substances, mining operations or a variety of other uses. One method used to obtain information regarding subterranean formations is to use acoustic or seismic waves to interrogate the formation. Seismic waves may be generated into the formation and the resulting reflected waves received and analyzed in order to provide information about the geology of the formation. Such interrogations are referred to as active seismic surveys.

Microseismic monitoring concerns passively monitoring a formation for seismic events which are very small. In passive monitoring, the formation is not interrogated, per se, but seismic receivers are placed to receive directly any seismic waves generated by events occurring within the formation. Such events may include the seismic effects generated in a formation by fracturing, depletion, flooding, treatment, fault movement, collapse, water breakthrough, compaction or other similar subterranean interventions or effects. This additional information about these events may be very useful in order to enhance the use of the formation or provide additional safety measures in certain situations. For example, it is common in the hydrocarbon production industry to fracture or "frac" a formation. During this operation, fluid and propant is pumped down a well at high pressure in order to generate additional fracturing within a zone of the well. The propant is pumped into these fractures and maintains them after the pressure is removed. Monitoring the seismic waves generated during and immediately after a frac operation can provide critical information about the operation, such as the direction and extent of the fractures being generated.

In yet another exemplary application, microseismic monitoring may be used to provide long-term monitoring for subterranean storage facilities and formations from which hydrocarbons or water is being produced. Under certain conditions, the integrity of these formations may become compromised, causing collapse. Such collapses may pose a safety concern for those on the surface, as entire sections of ground may fall into the collapse. However, often certain characteristic small seismic waves may precede such failures, permitting remedial measures to delay the collapse and ultimately warn of the impending collapse to allow for isolation of any dangerous areas from personnel.

Figure 1:
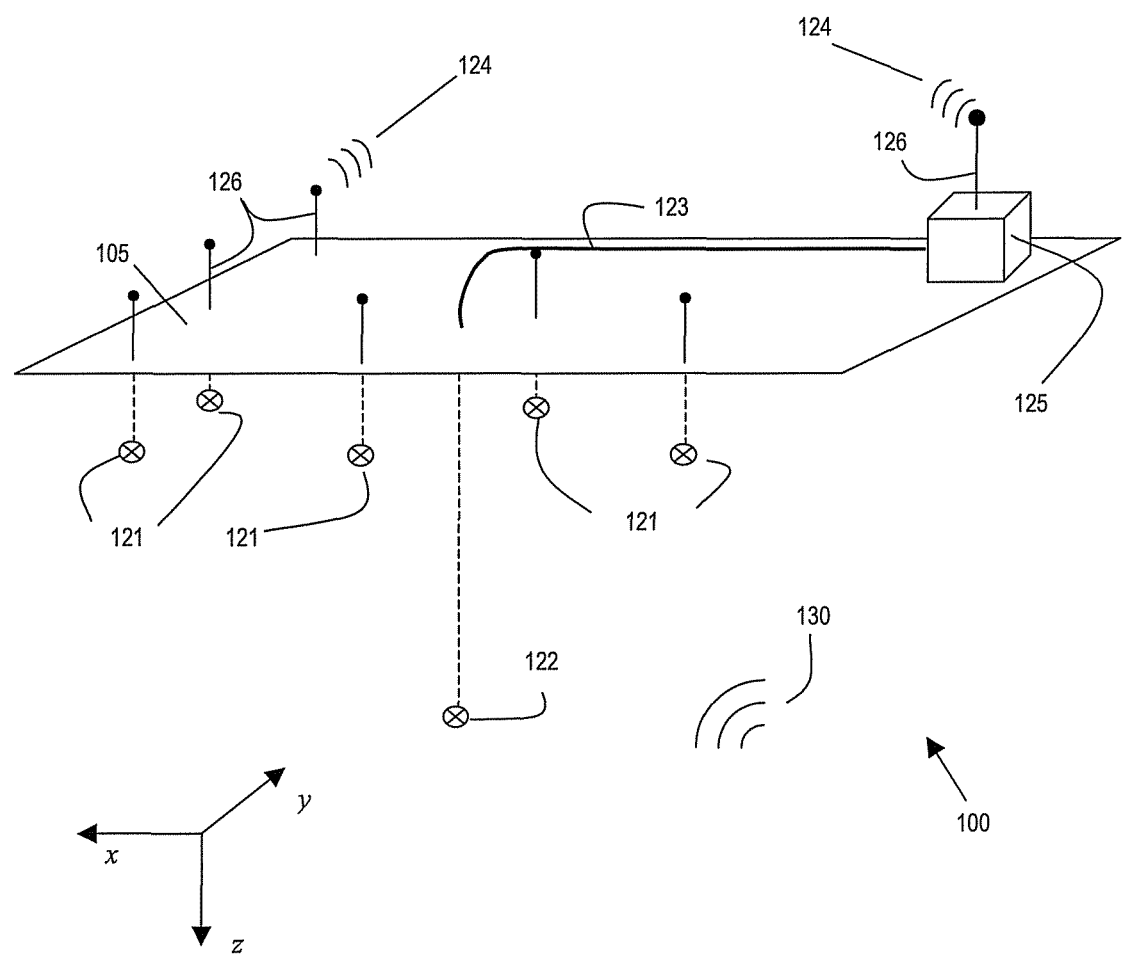
FIG. 1 illustrates aspects of a seismic network.

Referring to FIG. 1, in some embodiments, one or more subterranean formations are monitored using a network 100 of seismic receivers. The network 100 includes a plurality of seismic receivers 121 and 122, each of which are adapted for operation to receive seismic waves 130 generated by seismic activity and generate seismic trace data representing the waves 130 and indicative of the seismic activity. Each receiver 121, 122 may be a geophone (as shown in FIG. 1) and/or a hydrophone placed at the surface, and may be submerged in wells or on the ocean floor. Each receiver 121, 122 may be an analog or digital receiver. Other types of seismic receivers known now or in the future may also be used. Receivers 121, 122 may be placed in shallow wells (for example, above the formation of interest), deep wells (for example, at or below the formation of interest) or at the surface. The receivers 121, 122 may be sensitive to seismic waves along a certain axis or those traveling on any axis. Likewise, the receivers 121, 122 may be sensitive to only certain types of seismic waves, or several types. Those receivers 121, 122 sensitive to a certain axis of travel, called directional receivers 121, 122, may be coupled with other directional receivers 121, 122. For example, multiple directional receivers 121, 122 may be coupled together in a set of three orthogonal receivers which collect information about the waves in three dimensions. This three-dimensional information may be rotated mathematically through the use of trigonometric functions in order to derive information as to wave travel in the x-axis, y-axis, and z-axis relative to gravity. Alternatively, mathematical rotation may provide translation of the data relative to a wellbore, a cardinal direction, or any other reference point.

In one embodiment, the plurality of receivers 121, 122 includes one or more shallow well receivers 121 and one or more deep well receivers 122. The shallow well receivers 121 may be disposed at depths that are smaller than the depths at which the deep well receivers 122 are disposed. FIG. 1 shows the network 100 as including a plurality of shallow well receivers 121 and a single deep well receiver 122. However, any number of deep well receivers 122 or shallow well receivers 121 may be included in the network 100.

The seismic waves of interest for microseismic monitoring are generally of very small amplitude. As small amounts of noise will affect the signal to noise ratio of the received signals greatly, it is advantageous to place the receivers 121, 122 in an area where noise is minimized. In one embodiment, the receivers 121, 122 should be placed as close to the source as possible. Such a placement maximizes the signal to noise ratio appreciated from the receiver. However, as the location of the sources is unknown at the onset, such a placement may not be feasible or possible. Additionally, the location of the sources of interest may generally be deep; placement nearby may be prohibitively costly, particularly for a large network. Though receivers 121, 122 may be placed at the surface or undersea under the present invention, one embodiment places the receivers beneath the weather layer. The weather layer is the geological layer under which the effects of climatological changes (wind, rain, temperature, humidity, etc.) are not detectable.

The data from a single receiver is referred to as a "trace." In one embodiment, the values received from each of the plurality of receivers 121, 122 are normalized, such as by division by the standard deviation to achieve a scale value maximum of 1.

In one embodiment, multiple receivers 121, 122 may be placed in a single location so that data may be recorded from multiple receivers 121, 122. For example, receivers 121, 122 that are sensitive to x-axis, y-axis and z-axis directions may be disposed in a single location to record seismic events or activity. In such an example, three or more traces may be generated from each single location.

In one embodiment, the network 100 for detecting seismic events, such as microseismic events, includes a relatively large set (i.e., plurality) of shallow well (or surface) receivers 121 and a relatively small set (i.e., plurality) of deep well receivers 122 or a single deep well receiver 122. The large set of shallow well receivers 121 may be triggered by the small set of deep well receivers 122. In one embodiment, the small set of deep well receivers is a single deep well receiver 122, such as is shown in FIG. 1. Although the shallow well receivers 121 are referred to as "shallow well" receivers, such receivers 121 may include surface receivers and receivers below water. In one embodiment, the shallow well receivers 121 may include surface placed receivers and receivers in wells that are up to 1000 meters in depth. In another embodiment, it is desirable that the shallow well receivers 121 be placed below the weather layer so as to minimize noise interference from the surface, thus increasing the signal to noise ratio appreciated by the shallow well receivers 121. It may also be desirable to have all of the shallow well receivers 121 placed at the same depth within a geology having a uniform velocity model. However, in an alternative embodiment, shallow well receivers 121 of a variety of depths or within disparate velocity models may be used, with the data ultimately collected being corrected for such features. It will be understood that, though a "receiver" may be referred to in the singular, it may include one or more actual seismic sensors. For example, a shallow well receiver 121 may include three component receivers.

In one embodiment, the shallow well receivers 121 are permanent sensors, cemented in place in wells without casing. In alternate embodiments, however, the shallow well receivers 121 may be placed within cased wells, placed at the surface in a temporary manner or otherwise located by other methods known now or in the future.

The geometry of the placement of the shallow well receivers 121 may be of several types in order to facilitate processing. In one embodiment, a square grid, a triangular grid, a hexagonal grid or other shape may facilitate processing the results. Accordingly, any configuration of the set of receivers may be used, as desired by the user and/or based on the environment.

Figure 2:
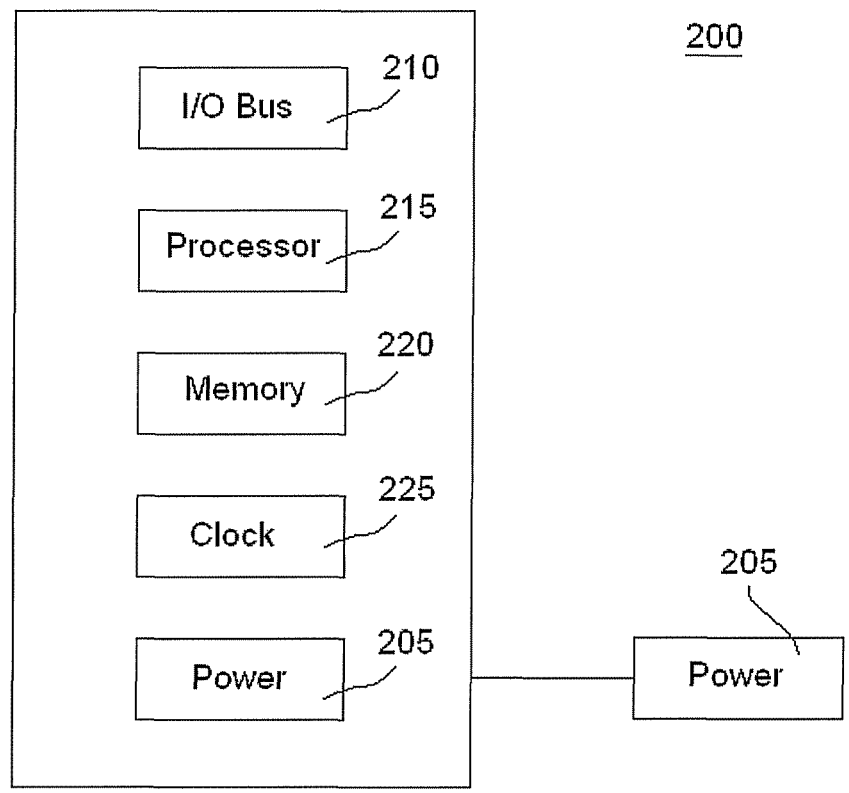
FIG. 2 illustrates an embodiment of a collection machine.

Referring to FIG. 2, the plurality of receivers 121, 122 may be connected to at least one collector, which may be a collection machine 125 or other device or system adapted to receive input information from one or more of the plurality of receivers 121, 122. In one embodiment, the collector may include one or more collection machines 125 or other devices. In one embodiment, the collection machine 125 may receive input information in the form of an indication of a seismic event. The collection machine may also be adapted to receive input information from a receiver, such as a deep well receiver 122, and trigger monitoring in one or more other receivers, such as shallow well receivers 121.

The collection machine 125 may include a computer system having a storage medium. In one embodiment, the collection machine 125 may include, without limitation, at least one power supply 205, an input/output bus 210, a processor 215, a memory device or system 220, a clock 225 or other time measurement device, and other components (not shown) such as an input device and an output device. The power supply 205 may be incorporated in a housing along with other components of the collection machine 125, or may be connected remotely such as by a wired connection. Other components may be included as deemed suitable.

In the embodiment shown in FIG. 1, the deep well receiver 122 is connected to the collection machine by a direct connection 123, such as a wired connection. The plurality of shallow well receivers 121 is connected to the collection machine 125 via a wireless connection 124. The wireless connection 124 may be provided for by an antenna 126 (and other suitable wireless equipment) for generation of a wireless communications signal. The illustration of FIG. 1 is non-limiting and merely exemplary of one embodiment of the microseismic network 100. For example, any number of shallow well receivers 121 and deep well receivers 122 may be included in the network 100. Furthermore, the collection machine 25 may be connected to the plurality of receivers 121, 122 by any combination of connections, included direct connections and wireless connections.

The shallow well receivers 121 may be equipped with transmission equipment to communicate therebetween. The collection machine 125 may be located near one of the receivers 121, 122. In one embodiment, the receivers 121, 122 may communicate thorough several other receivers 121, 122 in order to communicate with the collection machine 125. By using a network of shallow well receivers 121 adapted to communication therebetween, direct connection between each receiver 121, 122 and the collection machine 125 may be avoided and the expandability of the network preserved. In one embodiment, the transmission equipment is a wireless interface, operating in the radio frequency range. For example, it has been observed that a high-gain antenna with commercially-available computer wireless equipment may reach up to 8 km. In other embodiments, the interface is also wireless, but operates on a microwave or light frequency. In still other embodiments, wires or fiber optics may provide the connections.

In one embodiment, communications between a receiver 121, 122 and the collection machine 125 may be dynamically routed, so as to provide maximum reliability of the communication. Accordingly, if a certain route is blocked or displays a less than optimal reliability, information may be routed to another path through the network of receivers 121, 122 to reach the collection machine 125.

One or more deep well receivers 122 may also to be used to monitor seismic events. The deep well receivers 122 may be placed as close to the expected sources as possible. In one embodiment, a relatively small number of deep well receivers 122 are used, relative to the number of shallow well receivers 121. In one embodiment, contrary to the prior art teaching that deep monitoring receivers are best placed in low-velocity geologies in order to minimize reflection interference, one or more deep well receivers 122 may be placed within a particularly high-velocity layer sandwiched between two particularly low-velocity layers.

In one embodiment, the monitoring equipment of the deep well receivers 122 are connected to the collection machine 125. This connection may be accomplished wirelessly in manners similar to the shallow well receiver 121 interconnections. In one embodiment, the connection between the one or more deep well receivers 122 and the collection machine 125 is provided by a wired or optical fiber connection, which may increase reliability and reduce susceptibility to interference as compared to wireless connections.

Figure 3:
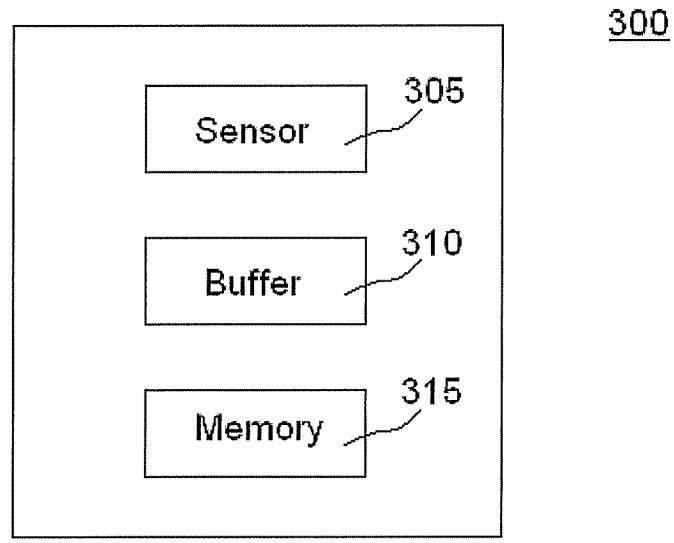
FIG. 3 illustrates an embodiment of a shallow well receiver.

Referring to FIG. 3, each of the shallow well receivers 121 may be connected to one or more components to aid in monitoring and processing seismic data. Each shallow well receiver 121 may include one or more sensors 305, a buffer 310 or other temporary memory device, and/or a memory device 315. The memory device 315 may be a permanent or semi-permanent storage medium, such as a hard drive.

Each shallow well receiver 121 may be provided with the buffer 310 or other temporary data storage device, such as a cache. In one embodiment, seismic data generated from monitoring, such as constant monitoring, is temporarily stored in the buffer 310. The size and configuration of the buffer 310 may vary according to application. In one embodiment, a limited amount of temporarily stored data is stored in the buffer 310. Once filled, the buffer 310 may be continuously overwritten or selectively flushed as new data is acquired, such as in a FIFO (First In First Out) storage model. Accordingly, the shallow well receiver 121 may be configured to retain, for example, the last 30 seconds of data, after which time such data is deleted in favor of more recent data. The time period during which such data is retained is not limited, and may be any desired time period.

Each shallow well receiver 121 may also be provided with a memory device 315, such as a semi-permanent storage medium. Such a medium may include a hard drive or a large memory cache.

Figure 4:
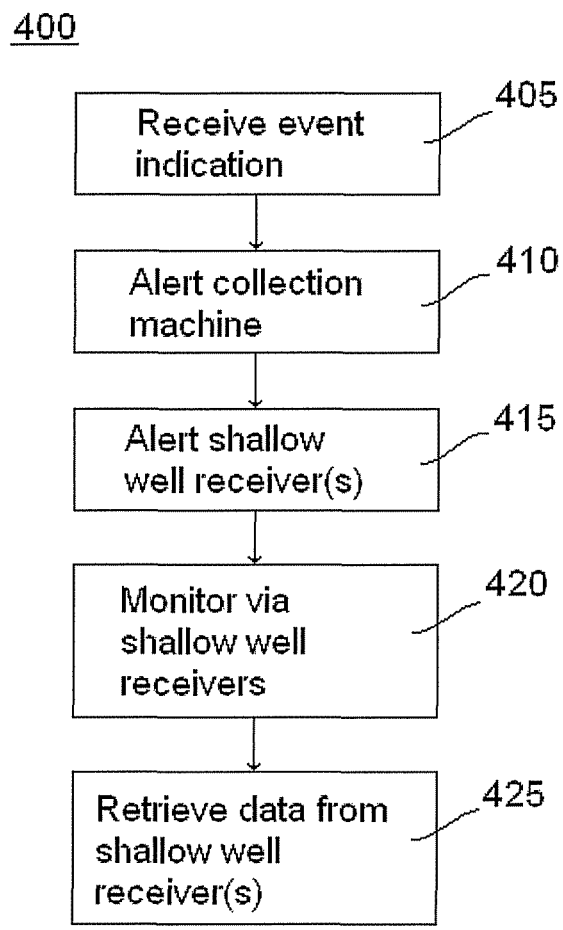
FIG. 4 is a flowchart illustrating exemplary aspects of a method for monitoring seismic events.

FIG. 4 illustrates a method 400 for monitoring seismic events, which may be utilized in, but is not limited to, microseismic passive monitoring. The method 400 includes one or more stages 405, 410, 415, 420 and 425. The method 400 is described herein in conjunction with the plurality of receivers 121, 122, although the method 400 may be performed in conjunction with any number and configuration of receivers. The method 400 may be performed by the collection machine 125 and/or any other processor, which may be associated with the collection machine 125 and/or one or more of the plurality of receivers 121, 122.

In the first stage 405, the deep well receiver 122 monitors a formation and may receive an indication of a seismic event. A seismic event indication may include detection of seismic event data generated by the deep well receiver 122 that exceeds a threshold value.

In the second stage 410, at such time as the deep well receiver 122 receives indication of an event, the deep well receiver 122 alerts the collection machine 125 to the possible event. In one embodiment, the deep well receiver 122 alerts the collection machine 125 immediately upon receiving the indication.

In the third stage 415, upon receipt of the alert from the deep well receiver 122, the collection machine 125 alerts the shallow well receivers 121 in the network 100. The collection machine 125 may alert all of the shallow well receivers 121, or any subset thereof. The collection machine may alert the shallow well receivers immediately or at any selected time after receipt of the alert from the deep well receiver 122.

In the fourth stage 420, the collection machine 125 triggers monitoring in the shallow well receivers 121. Triggering monitoring may include causing the shallow well receivers 121 to monitor seismic activity in response to the alert received from the collection machine 125, or from any other communication or command received from the collection machine 125. Monitoring may also include recording seismic data to a memory.

In one embodiment, when each shallow well receiver 121 receives such an alert, it immediately copies the temporarily stored data stored in the buffer 310 to the memory device 315 and begins to record new incoming seismic data to the memory device 315.

Monitoring of seismic activity by the shallow well receivers 121, i.e., recording to the memory device 315, may continue according to a number of parameters. The shallow well receivers 121 may record new incoming seismic data in various manners. In one embodiment, the shallow well receivers 121 receiving the alert may constantly record incoming seismic data. In another embodiment, the shallow well receivers 121 receiving the alert may record incoming seismic data periodically. In this embodiment, the shallow well receiver 121 may record seismic data for a first duration before ceasing recording for a second duration. The recording process then repeats. The first duration and second duration may be configured to meet the requirements of the survey and the available memory 315 to the shallow well receiver 121. Recording durations, and intervals therebetween, may be set to time periods of varying length, and as desired. The shallow well receivers may be configured to commence recording immediately upon receipt of an alert, or at any selected time thereafter.

In one embodiment, the receivers 121 record for a set period of time. In another embodiment, the shallow well recording period is dependant upon the incoming seismic signals. For example, the shallow well receiver 121 may terminate recording at a selected time (e.g., 10 seconds) after the seismic signal drops below a threshold level. The parameters of recording may be static or dynamic. Parameters may also differ from channel to channel. For example, the x-component of a shallow well receiver 121 may be recorded for 30 seconds following an event; the y-component may be recorded until 10 seconds after the energy level detected falls below 50 percent of the maximum value recorded on the channel for the last 10 minutes; the z-component may be recorded until the time the frequency of a detected signal changes. In one embodiment, however, the receivers are adapted for operation to retrieve some noise on either side of the signal of interest.

In the fifth stage 425, once the event is passed, the collection machine 125 communicates with the receivers 121, 122 in the network 100 in order to retrieve the seismic data. The collection machine may retrieve seismic data stored in the memory device of one or more of the shallow well receivers 121, which may include the temporarily stored seismic data and/or the newly recorded seismic data. The collection machine 125 may also retrieve seismic data generated by and/or stored in the deep well receiver 122. In one embodiment, the collection machine 125 may poll each receiver 121, 122 to retrieve the seismic data. In this fashion, the network 100 need not be large enough to quickly transmit all the data from all of the receivers simultaneously. The collection machine may store the retrieved seismic data in a memory device, such as memory device 220, or otherwise transmit the data to a selected location for storage and analysis.

If several deep well receivers 122 are available in a network configuration, the collection machine 125 may be configured to trigger only a subset of the shallow well receivers 121 to record seismic data in response to the event detected by one of the deep well receivers 122. In one embodiment, those shallow well receivers 121 triggered would be those proximate to the deep well receiver 122 that originally detected the event. It is also possible that a single shallow well receiver 121 may be activated by triggering events at more than one deep well receiver 122.

In one embodiment, the network 100 may be put into place all at one time. In an alternative embodiment, a small number of deep well receivers 122 may be placed first and monitored in order to locate where events of interest occur most frequently. Using this data, additional deep well receivers 122 may be placed and the shallow well receivers 121 may be placed in order to optimize performance of the network 100. Accordingly, spacing, depth and receiver type and orientation may be formulated to conform to the type of events that are experienced within the realm of interest.

The systems and methods described herein provide various advantages over existing seismic monitoring systems. Monitoring of an entire network, which may consist of tens or hundreds of sensing locations, may generate a large number of traces. Additionally, in order to generate meaningful data, the sampling rate of the receivers may exceed the frequency of the waves to be detected. It is not unusual for the waves to be in excess of 150 Hz and for sampling to be taken at 1 to 2 KHz. Constant monitoring of the traces from these receivers would result in a massive data set requiring a large storage medium. Additionally, constant monitoring requires additional bandwidth for transmission between the receivers and the ultimate analysis destination, such as collection machine 25.

The systems and methods described herein allow for the amount of data storage and bandwidth required to be limited, and thus provide a cost savings for the system. Additionally, as relatively few deep well receivers are required, the costs of the positioning of the receivers, such as the need to drill many deep wells, can be greatly reduced.

In support of the teachings herein, various analysis components may be used, including digital and/or an analog systems. The devices and methods described herein may be implemented in software, firmware, hardware or any combination thereof. The devices may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the devices and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure. The computer executable instructions may be included as part of a computer system or provided separately.

Further, various other components may be included and called upon for providing for aspects of the teachings herein. For example, a pump, piston, power supply (e.g., at least one of a generator, a remote supply and a battery), motive force (such as a translational force, propulsional force or a rotational force), magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for detecting seismic events, the system comprising:
    a plurality of seismic receivers, at least one of the receivers in the plurality adapted for: monitoring seismic activity in an earth formation, providing an alert to at least another of the receivers in the plurality upon detection of a seismic event generated within the earth formation, and triggering the monitoring in the at least another of the receivers in the plurality, the at least one of the receivers being positioned at a first location relative to the earth formation and the at least another of the receivers being positioned at a second location that is different than the first location, wherein the at least one of the receivers is at least one deep well receiver, and the at least another of the receivers is a plurality of shallow well receivers, the at least one deep well receiver configured to detect the seismic event and trigger monitoring in the plurality of shallow well receivers.

2. The system of claim 1, wherein the monitoring in the at least another of the seismic receivers is selected from: constant monitoring and periodic monitoring.

3. The system of claim 1, further comprising a buffer in communication with the at least another of the seismic receivers for temporarily storing data during a selected time period.

4. The system of claim 1, further comprising a collection machine configured for receiving input information and triggering the monitoring of at least one of the receivers, wherein the input information is an indication of a seismic event, the collection machine positioned remotely from the at least one seismic receiver and the at least another seismic receiver.

5. The system of claim 4, wherein the at least one deep well receiver is communicatively connected to the collection machine via a direct connection, and the plurality of shallow well receivers is communicatively connected to the collection machine via a wireless connection.

6. The system of claim 1, further comprising a memory device for storing seismic data, in communication with the at least another of the seismic receivers.

7. The system of claim 1, further comprising a network coupling at least two of the plurality of seismic receivers to a collector, wherein the coupling comprises at least one of: a wireless connection, a wire connection, and a fiber optic connection.

8. The system of claim 1, further comprising a collection machine configured to receive input information from the at least one deep well receiver and trigger the monitoring in the plurality of shallow well receivers.

9. A method for detecting seismic events, the method comprising:
    monitoring seismic events in an earth formation with at least one of a plurality of seismic receivers, the plurality of seismic receivers including at least one deep well receiver and a plurality of shallow well receivers;
    upon detection of a seismic event generated within the earth formation by the at least one deep well receiver, providing an alert from the at least one deep well receiver to at least one of the plurality of shallow well receivers, the at least one of the plurality of shallow well receivers being positioned at a first location relative to the earth formation and the at least one deep well receiver being positioned at a second location that is different than the first location; and
    triggering the monitoring in the plurality of shallow well receivers by the at least one deep well receiver.

10. The method of claim 9, wherein the seismic events are generated in the earth formation due to a downhole operation.

11. The method of claim 9, wherein detection of an event comprises detection of seismic event data comprising a value exceeding a threshold value.

12. The method of claim 9, wherein providing an alert comprises providing the alert to a collection machine, and providing the alert from the collection machine to the at least one of the plurality of shallow well receivers, the collection machine positioned remotely from the at least one of the plurality of shallow well receivers and the at least one deep well receiver.

13. The method of claim 12, further comprising storing data in the collection machine, the data generated by the plurality of shallow well receivers by the monitoring.

14. The method of claim 9, further comprising receiving seismic waves and generating seismic data in the plurality of shallow well receivers, and temporarily storing the seismic data in a temporary buffer device during a selected time period.

15. The method of claim 14, wherein storing comprises storing the seismic data in a first-in/first-out (FIFO) manner.

16. The method of claim 14, wherein triggering the monitoring comprises transferring the temporarily stored data to a memory device, and storing additional seismic data generated after the triggering.

17. The method of claim 16, further comprising storing the temporarily stored seismic data and the additional seismic data from the at least another of the receivers in a collection machine.

18. A computer program product comprising machine readable instructions stored on machine readable media, the instructions for detecting seismic events by implementing a method comprising:

monitoring seismic events in an earth formation with at least one of a plurality of seismic receivers, the plurality of seismic receivers including at least one deep well receiver and a plurality of shallow well receivers;

upon detection of an event generated within the earth formation by the at least one deep well receiver, providing an alert from the at least one deep well receiver to at least one of the plurality of shallow well receivers, the at least one of the plurality of shallow well receivers being positioned at a first location relative to the earth formation and the at least one deep well receiver being positioned at a second location that is different than the first location; and triggering the monitoring in the plurality of shallow well receivers by the at least one deep well receiver.

* * * * *